United States Patent
Joo et al.

(10) Patent No.: US 8,665,149 B2
(45) Date of Patent: Mar. 4, 2014

(54) APPARATUS AND METHOD FOR PROCESSING NAVIGATION SIGNAL

(75) Inventors: In One Joo, Daejeon (KR); Sang Uk Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 386 days.

(21) Appl. No.: 13/106,300

(22) Filed: May 12, 2011

(65) Prior Publication Data
US 2011/0279313 A1 Nov. 17, 2011

(30) Foreign Application Priority Data

May 13, 2010 (KR) .......................... 10-2010-0045015
Jan. 6, 2011 (KR) .......................... 10-2011-0001345

(51) Int. Cl.
*G01S 19/24* (2010.01)
*G01S 19/29* (2010.01)
*G01S 19/30* (2010.01)

(52) U.S. Cl.
CPC ................ *G01S 19/24* (2013.01); *G01S 19/29* (2013.01); *G01S 19/30* (2013.01)
USPC ............. 342/357.63; 342/357.68; 342/357.69

(58) Field of Classification Search
CPC ....... G01S 19/29; G01S 19/30; G01S 19/243; G01S 19/24
USPC ........................... 342/357.63, 357.68, 357.69
See application file for complete search history.

(56) References Cited

U.S. PATENT DOCUMENTS

| 6,141,570 | A | 10/2000 | O'Neill, Jr. et al. |
| 6,836,241 | B2 * | 12/2004 | Stone et al. ............... 342/357.63 |
| 6,873,910 | B2 * | 3/2005 | Rowitch et al. ............... 701/469 |
| 7,956,804 | B2 * | 6/2011 | Jin et al. ................... 342/357.68 |
| 8,212,720 | B2 * | 7/2012 | Waters et al. ............. 342/357.42 |
| 2003/0085837 | A1 * | 5/2003 | Abraham ................... 342/357.1 |
| 2007/0152876 | A1 * | 7/2007 | Wang et al. ............... 342/357.02 |

FOREIGN PATENT DOCUMENTS

KR 2006-0088300 A 8/2006

* cited by examiner

*Primary Examiner* — Gregory C Issing
(74) *Attorney, Agent, or Firm* — Rabin & Berdo, P.C.

(57) ABSTRACT

An apparatus and method for processing a navigation signal are provided. When a navigation signal is received and processed, a search range associated with signal processing may be reduced by directly computing a clock offset of a receiving terminal, and accordingly it is possible to reduce an operation amount associated with the signal processing, and an amount of a power consumed by the receiving terminal. Additionally, due to a reduction in the search range, it is also possible to reduce a time required to acquire a signal.

8 Claims, 7 Drawing Sheets

APPARATUS AND METHOD FOR PROCESSING NAVIGATION SIGNAL

CROSS-REFERENCE TO RELATED APPLICATIONS

This application claims the benefit of Korean Patent Application No. 10-2010-0045015 and of Korean Patent Application No. 10-2011-0001345, respectively filed on May 13, 2010 and Jan. 6, 2011, in the Korean Intellectual Property Office, the disclosures of which are incorporated herein by reference.

BACKGROUND

1. Field of the Invention

The present invention relates to an apparatus and method for processing a navigation signal, and more particularly, to a navigation signal processing apparatus and method that may receive a navigation signal from a navigation satellite and may process the received navigation signal.

2. Description of the Related Art

A Global Positioning System (GPS) is a unique Global Navigation Satellite System (GNSS) that is being completely operated. The GPS was developed by the Pentagon, and is being used for military and civil purposes, such as weapon guidance, navigation, measurements, map-making, surveying, time synchronization, and the like.

Since a GPS receiving terminal becomes more common, the GPS receiving terminal is combined with a portable terminal, such as a Portable Multimedia Player (PMP), an MPEG Audio Layer-3 (MP3) player, a smart phone, and the like, and is used in various fields, such as a Location-Based Service (LBS) field, a Geographic Information System (GIS) field, a field of tracking a moving target, a telematics field, and the like.

As described above, the GPS receiving terminal combined with the portable terminal that is becoming multifunctional is used, and accordingly needs for GPS receiving technologies with low power are being significantly increased in view of guarantee of durability of a terminal.

In a technology among conventional technologies for reducing power consumption in a GPS receiving terminal, a GPS signal strength is measured by a portable terminal equipped with the GPS. When the measured GPS signal strength is equal to or less than a threshold, a GPS function may be blocked. Conversely, when the measured GPS signal strength is greater than the threshold, the GPS function may be performed. Thus, it is possible to efficiently manage a power, thereby reducing power consumption.

Additionally, in another technology, a mobile phone equipped with a GPS receives a predetermined message stating whether a GPS signal is receivable in an area where the mobile phone is placed. When a message stating that the GPS signal is not receivable is received, an operation of the GPS may be stopped. Conversely, when a message stating that the GPS signal is receivable is received, the operation of the GPS may be performed. Thus, it is possible to efficiently manage a power, thereby reducing power consumption.

However, in the conventional technologies, specific environmental conditions, such as information regarding whether a navigation signal is currently receivable, or current location information of a terminal, are determined, and a power of a navigation receiving terminal is controlled. Accordingly, there is a need for a technology that may reduce an available operation amount, and power consumption, regardless of the specific environmental conditions.

SUMMARY

An aspect of the present invention provides a navigation signal processing apparatus and method that may reduce a search range associated with signal processing, by directly computing a clock offset of a receiving terminal, when a navigation signal is received and processed. Accordingly, it is possible to reduce an operation amount associated with the signal processing, and an amount of a power consumed by the receiving terminal, and is also possible to reduce a time required to acquire a signal.

According to an aspect of the present invention, there is provided a navigation signal processing apparatus for processing a navigation signal received from a navigation satellite and generating location information regarding a location of a receiving terminal, the navigation signal processing apparatus including: a database; a receiving unit to receive the navigation signal from the navigation satellite; an operation unit to compute a clock offset of the receiving terminal based on the navigation signal when navigation satellite information associated with the navigation satellite is not stored in the database, and to compute the clock offset based on the navigation satellite information when the navigation satellite information is stored in the database; and a processing unit to detect a frequency offset and a code offset from the navigation signal, to search for a search range, and to generate the location information, the search range being based on the frequency offset and the code offset, except the clock offset.

When the navigation satellite information is not stored in the database, the operation unit may compute a Doppler frequency shift based on a correlation between the Doppler frequency shift and the code offset, and may compute the clock offset by subtracting the Doppler frequency shift from the frequency offset. The receiving unit may receive first navigation data, and may receive second navigation data after a time interval synchronized with a code period of the navigation signal. The processing unit may detect a first code offset from the first navigation data, and may detect a second code offset from the second navigation data. The operation unit may compute the Doppler frequency shift, based on a carrier frequency, a code frequency, the time interval, and a value obtained by subtracting the first code offset from the second code offset. Here, the carrier frequency, the code frequency, and the time interval may be associated with the navigation signal.

When the navigation satellite information is stored in the data base, the operation unit may compute a Doppler frequency shift based on the navigation satellite information, and may compute the clock offset by subtracting the Doppler frequency shift from the frequency offset. Additionally, the operation unit may compute a location and a speed of the navigation satellite based on the navigation satellite information, and may compute the Doppler frequency shift based on the location and the speed of the navigation satellite, a carrier frequency, a speed of a light, a distance between the navigation satellite and the receiving terminal, and the location and a speed of the receiving terminal that are included in the navigation satellite information.

The navigation satellite information may include at least one of a time, orbit data, an almanac, information on the location of the receiving terminal, and information on a speed of the receiving terminal, wherein the time, the orbit data, and the almanac are associated with the navigation satellite.

According to another aspect of the present invention, there is provided a navigation signal processing method for processing a navigation signal received from a navigation satellite and generating location information regarding a location of a receiving terminal, the navigation signal processing method including: receiving the navigation signal from the navigation satellite; computing a clock offset of the receiving terminal based on the navigation signal when navigation satellite information associated with the navigation satellite is not stored in a database, and computing the clock offset based on the navigation satellite information when the navigation satellite information is stored in the database; detecting a frequency offset and a code offset from the navigation signal; and searching for a search range, and generating the location information, the search range being based on the frequency offset and the code offset, except the clock offset.

The computing may include, when the navigation satellite information is not stored in the database, computing a Doppler frequency shift based on a correlation between the Doppler frequency shift and the code offset, and computing the clock offset by subtracting the Doppler frequency shift from the frequency offset.

The computing may include, when the navigation satellite information is stored in the database, computing a Doppler frequency shift based on the navigation satellite information, and computing the clock offset by subtracting the Doppler frequency shift from the frequency offset.

EFFECT

According to embodiments of the present invention, it is possible to reduce a search range associated with signal processing, by directly computing a clock offset of a receiving terminal, when a navigation signal is received and processed. Accordingly, it is possible to reduce an operation amount associated with the signal processing, and an amount of a power consumed by the receiving terminal. Additionally, due to a reduction in the search range, it is also possible to reduce a time required to acquire a signal.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
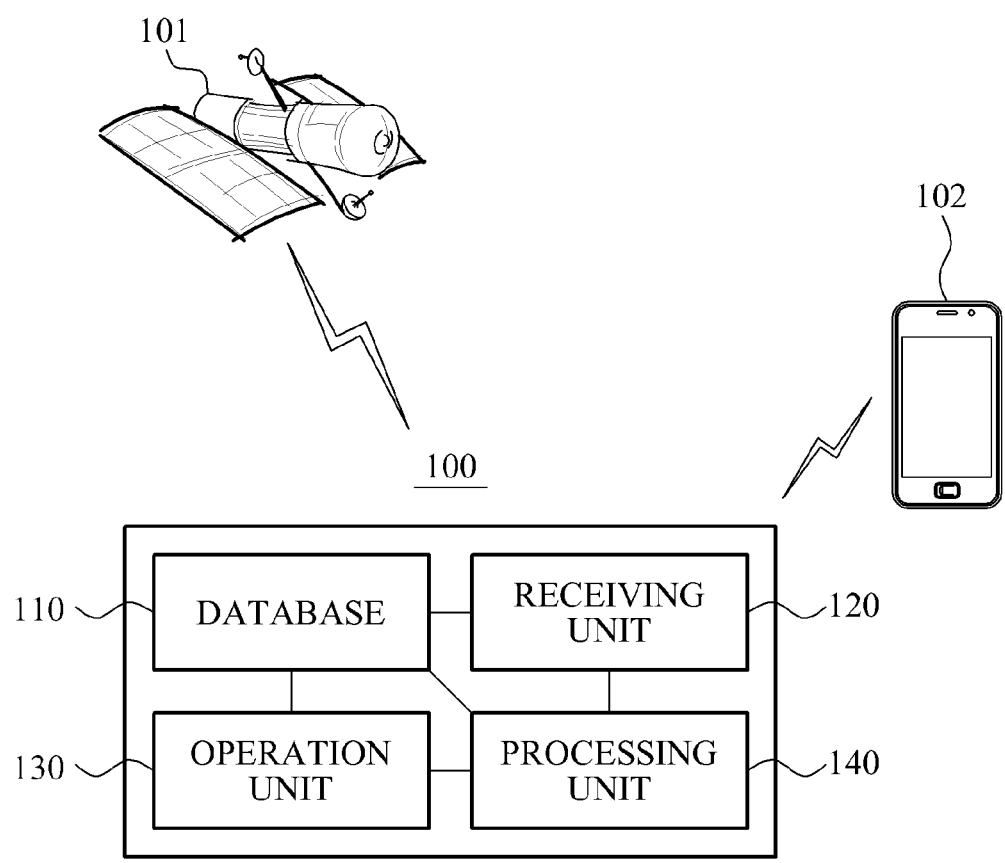
FIG. 1 is a diagram illustrating a configuration of a navigation signal processing apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a configuration of a navigation signal processing apparatus 100 according to an embodiment of the present invention.

Referring to FIG. 1, the navigation signal processing apparatus 100 may include a database 110, a receiving unit 120, an operation unit 130, and a processing unit 140.

The navigation signal processing apparatus 100 may receive a navigation signal from a navigation satellite 101, may perform a signal processing operation on the received navigation signal, and may generate location information regarding a location of a receiving terminal 102.

Here, the signal processing operation may include a signal acquiring operation and a signal tracking operation. The signal acquiring operation may be performed to detect, from the navigation signal, signal acquisition result information including at least one of a satellite number, a frequency offset, and a code offset. Additionally, the signal tracking operation may be performed to accurately track a signal using the detected signal acquisition result information and to generate location information.

Specifically, during the signal acquiring operation, the navigation signal processing apparatus 100 may search for a two-dimensional (2D) search range, and may generate the location information. The 2D search range may be configured with a frequency offset search range for the navigation signal, and a code offset search range for the navigation signal, and may be divided into equal size blocks. The frequency offset search range may be obtained by adding a range determined by a Doppler shift and a clock offset range for the receiving terminal 102. Accordingly, the navigation signal processing apparatus 100 may reduce a search range that needs to be searched for to generate the location information, by computing the clock offset range, so that an operation amount associated with generation of the location information may be reduced.

Hereinafter, an operation of each component of the navigation signal processing apparatus 100 will be described.

The receiving unit 120 may receive a navigation signal from the navigation satellite 101.

According to an aspect, the receiving unit 120 may receive a plurality of pieces of navigation data from the navigation satellite 101. Specifically, the receiving unit 120 may receive the plurality of pieces of navigation data for each time interval synchronized with a code period of the navigation signal.

The operation unit 130 may compute a clock offset of the receiving terminal 102. To compute the clock offset, the operation unit 130 may use different schemes based on whether navigation satellite information associated with the navigation satellite 101 is stored in the database 110.

The navigation satellite information may include at least one of a time, orbit data, an almanac, information on the location of the receiving terminal 102, and information on a speed of the receiving terminal 102. Here, the time, the orbit data, and the almanac may be associated with the navigation satellite 101.

When the navigation satellite information is not stored in the database 110, the operation unit 130 may compute the clock offset based on the navigation signal.

According to an aspect, when the navigation satellite information is not stored in the database 110, the operation unit 130 may compute a Doppler frequency shift based on a correlation between the Doppler frequency shift and the code offset. Here, the Doppler frequency shift may represent a shift value obtained by a motion of the navigation satellite 101 and a motion of the receiving terminal 102.

Additionally, the operation unit 130 may compute the clock offset by subtracting the Doppler frequency shift from a frequency offset detected from the navigation signal. In other words, the operation unit 130 may compute the clock offset, as given in the following Equation 1:

(Clock offset)=(Frequency offset)−(Doppler frequency shift) [Equation 1]

Hereinafter, an operation of computing, by the operation unit 130, the Doppler frequency shift based on the correlation between the Doppler frequency shift and the code offset will be further described with reference to FIG. 2.

Figure 2:
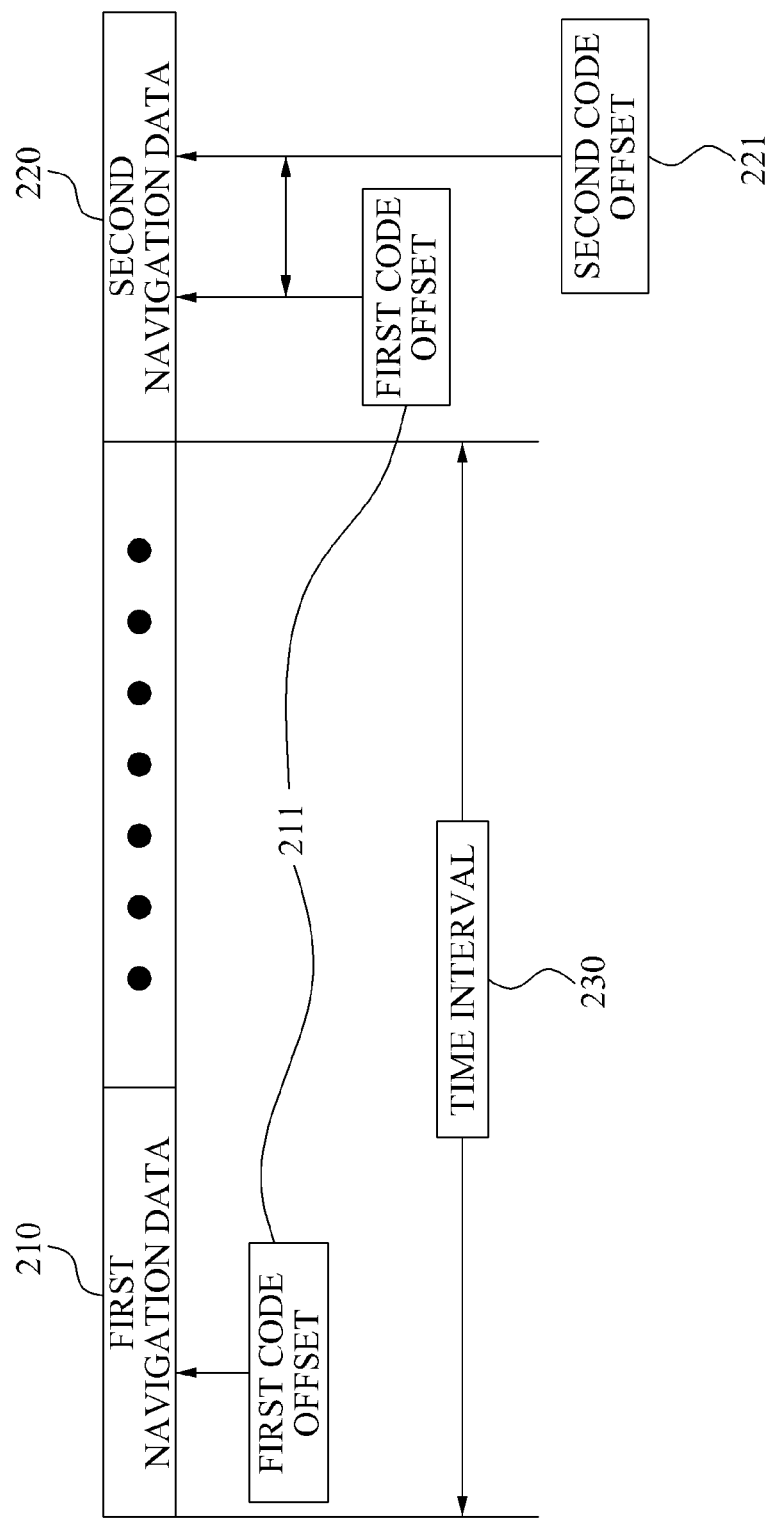
FIG. 2 is a diagram illustrating a correlation between a Doppler frequency shift and a code offset according to an embodiment of the present invention.

FIG. 2 is a diagram illustrating a correlation between a Doppler frequency shift and a code offset according to an embodiment of the present invention.

Referring to FIG. 2, a receiving unit of a navigation signal processing apparatus according to an embodiment of the present invention may receive first navigation data 210 from a navigation satellite. Additionally, the receiving unit may receive second navigation data 220 after a time interval 230 synchronized with a code period of a navigation signal.

A processing unit of the navigation signal processing apparatus may detect a first code offset 211 from the first navigation data 210. Depending on embodiments, the processing unit may further detect, from the first navigation data 210, a satellite number of a navigation satellite, and a first frequency offset.

The processing unit may also detect a second code offset 221 from the second navigation data 220. Depending on embodiments, the processing unit may further detect, from the second navigation data 220, a satellite number of a navigation satellite, and a second frequency offset.

When navigation satellite information associated with the navigation satellite is not stored in a database, an operation unit of the navigation signal processing apparatus may compute a Doppler frequency shift, based on a carrier frequency, a code frequency, the time interval 230, and a value obtained by subtracting the first code offset 211 from the second code offset 221. Here, the carrier frequency, the code frequency, and the time interval 230 may be associated with the navigation signal.

The correlation between the Doppler frequency shift and the code offset may be expressed as given in Equation 2.

(Second code offset 221−First code offset 211)=1/ Carrier frequency×(Code frequency×Time interval 230×Doppler frequency shift caused by motion of navigation satellite and motion of receiving terminal) [Equation 2]

Here, the carrier frequency and the code frequency may be set in advance, based on the navigation signal. In an example, when a GPS L5 signal or Galileo E5a signal is received as a navigation signal, the carrier frequency may be set to 1176.45 megahertz (MHz), the code frequency may be set to 10.23 MHz, and a code period may be set to 1 millisecond (ms). In another example, when a GPS L1 signal or Galileo E1 signal is received as a navigation signal, the carrier frequency may be set to 1574.42 MHz, the code frequency may be set to 1.032 MHz. In this example, when the GPS L1 signal is received, the code period may be set to 1 ms, and when the Galileo E1 is received, the code period may be set to 4 ms. In still another example, when a GPS L2C signal is received as a navigation signal, the carrier frequency may be set to 1227.60 MHz, the code frequency may be set to 511.5 kilohertz (KHz), and the code period may be set to 20 ms.

The operation unit may compute a Doppler frequency shift using Equation 3 given below. Here, Equation 3 may be obtained based on the Doppler frequency shift of Equation 2.

Doppler frequency shift=[(Second code offset 221−First code offset 211)*Carrier frequency]/(Code frequency×Time interval 230) [Equation 3]

Referring back to FIG. 1, when the navigation satellite information is stored in the database 110, the operation unit 130 may compute the clock offset based on the navigation satellite information.

According to an aspect, when the navigation satellite information is stored in the database 110, the operation unit 130 may compute the Doppler frequency shift based on the navigation satellite information.

In other words, the operation unit 130 may compute a location and a speed of the navigation satellite 101 based on the navigation satellite information. Depending on embodiments, the operation unit 130 may compute the location of the navigation satellite 101 in the form of (SVx, SVy, SVz), and may compute the speed of the navigation satellite 101 in the form of (SVvx, SVvy, SVvz).

Additionally, the operation unit 130 may compute the Doppler frequency shift, based on the location of the navigation satellite 101, the speed of the navigation satellite 101, a carrier frequency, a speed of a light, a distance between the navigation satellite 101 and the receiving terminal 102, and the location and a speed of the receiving terminal 102. Here, the location of the receiving terminal 102 may be displayed, for example, in the form of (RXx, RXy, RXz), and the speed of the receiving terminal 102 may be displayed, for example, in the form of (RXvx, RXvy, RXvz). Additionally, the location and the speed of the navigation satellite 101 may be included in the navigation satellite information.

In other words, the operation unit 130 may compute the Doppler frequency shift using the following Equation 4:

(Doppler frequency shift caused by motion of navigation satellite 101 and motion of receiving terminal 102)=−(Carrier frequency)/(Speed of light)* ((SVx−RXx)*(SVvx−RXvx)+(SVy−RXy)*(SVvy−RXvy)+(SVz−RXz)*(SVvz−RXvz))/(Distance between navigation satellite 101 the receiving terminal 102) [Equation 4]

Here, the distance between the navigation satellite 101 and the receiving terminal 102 may be computed as given in the following Equation 5:

(Distance between navigation satellite 101 and receiving terminal 102)= $\sqrt{(SVx-RXx)^2+(SVy-RXy)^2+(SVz-RXz)^2}$ [Equation 5]

Additionally, the operation unit 130 may compute the clock offset by subtracting the Doppler frequency shift from the frequency offset detected from the navigation signal. In other words, the operation unit 130 may compute the clock offset, as given in the above-described Equation 1.

The processing unit 140 may detect a frequency offset and a code offset from the navigation signal. Additionally, the processing unit 140 may search for a search range, and may generate the location information. Here, the search range may be based on the frequency offset and the code offset, except the clock offset.

Hereinafter, the search range will be further described with reference to FIGS. 3 and 4.

Figure 3:
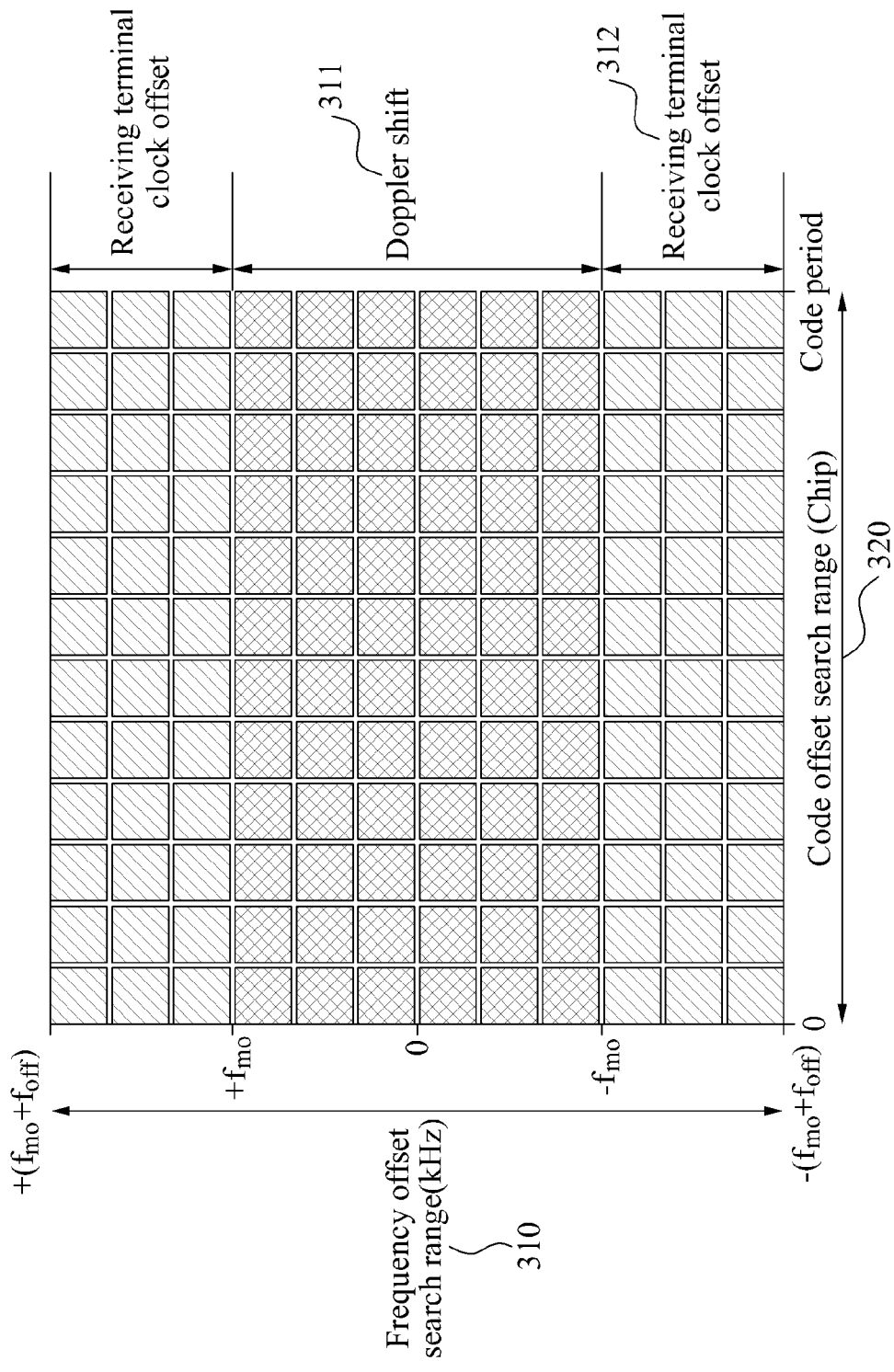
FIG. 3 is a diagram illustrating a search range used to acquire a signal in a conventional navigation signal processing apparatus.

FIG. 3 is a diagram illustrating a search range used to acquire a signal in a conventional navigation signal processing apparatus.

Referring to FIG. 3, when a signal acquiring operation is performed, the conventional navigation signal processing apparatus may search for a 2D search range, and may generate location information. Here, the 2D search range may be configured with a frequency offset search range 310 and a code offset search range 320, and may be divided into equal size blocks.

Here, the frequency offset search range 310 may be obtained by adding a range 311 to determined by a Doppler shift, and a clock offset range 312 for a receiving terminal. The Doppler shift may be caused by a motion of a navigation satellite and a motion of the receiving terminal.

When a GPS L1 signal is received as a navigation signal, the range 311 may be from about −5 KHz to +5 KHz.

Additionally, the clock offset range 312 may vary depending on a performance of a clock. For example, when a 3 ppm Temperature Compensated Crystal Oscillator (TCXO) clock is used, a clock offset of a receiver may occur in a range of about −5 KHz to +5 KHz.

Accordingly, for example, a GPS L1 receiving terminal using the 3 ppm TCXO clock may need to search for the frequency offset search range 310 of about −10 KHz to +10 KHz, to acquire a signal. In other words, as shown in FIG. 3, the range 311 is from about −5 KHz~+5 KHz, however, the conventional navigation signal processing apparatus needs to search for a range of about −10 KHz to +10 KHz by the clock offset range 312, to acquire a signal.

Figure 4:
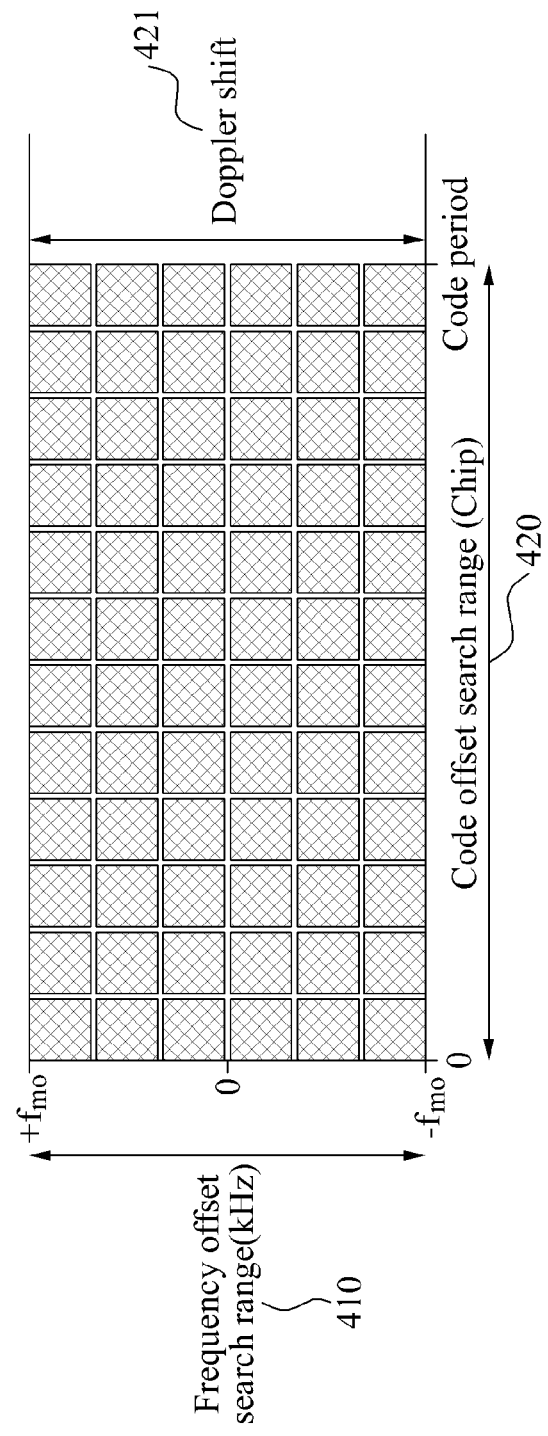
FIG. 4 is a diagram illustrating a search range used to acquire a signal in a navigation signal processing apparatus according to an embodiment of the present invention.

FIG. 4 is a diagram illustrating a search range used to acquire a signal in a navigation signal processing apparatus according to an embodiment of the present invention.

Referring to FIG. 4, since the navigation signal processing apparatus computes a clock offset of a receiving terminal as described with reference to FIGS. 1 and 2, the navigation signal processing apparatus may search for only a frequency offset search range 410 determined by a Doppler shift 421, and may generate location information regarding a location of the receiving terminal, during the signal acquiring operation.

In other words, the navigation signal processing apparatus may search for a 2D search range, and may generate the location information. Here, the 2D search range may be configured with the frequency offset search range 410 and a code offset search range 420, except a frequency offset search range determined by the clock offset, and may be divided into equal size blocks.

Figure 5:
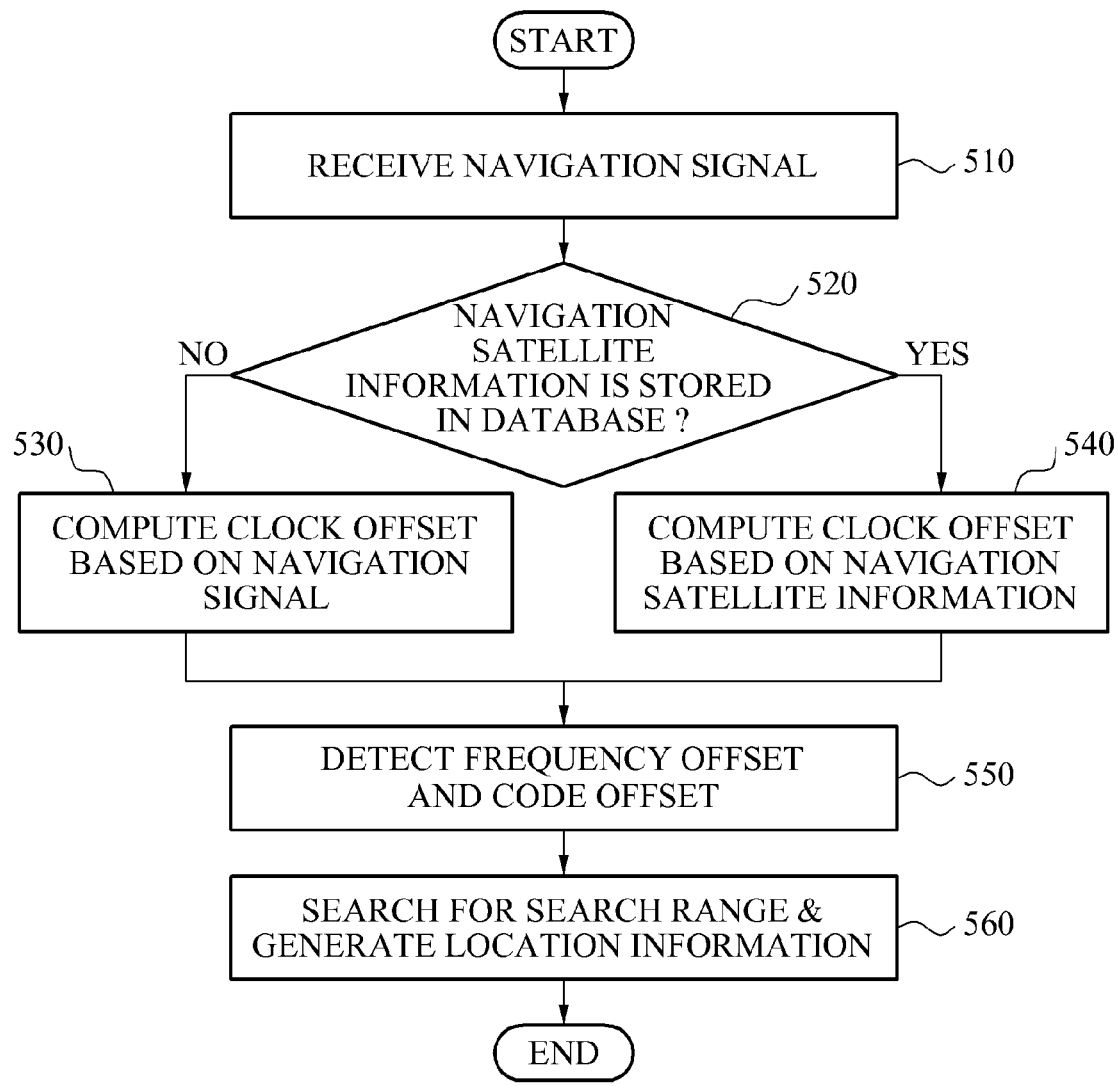
FIG. 5 is a flowchart illustrating a navigation signal processing method according to an embodiment of the present invention.

FIG. 5 is a flowchart illustrating a navigation signal processing method according to an embodiment of the present invention.

Referring to FIG. 5, in operation 510, a navigation signal may be received from a navigation satellite.

According to an aspect, a plurality of pieces of navigation data may be received from the navigation satellite. Specifically, the plurality of pieces of navigation data may be received for each time interval synchronized with a code period of the navigation signal.

In the navigation signal processing method, a clock offset of a receiving terminal may be computed. Here, the clock offset may be computed using different schemes based on whether navigation satellite information associated with the navigation satellite is stored in a database. Accordingly, in operation 520, whether the navigation satellite information is stored in the database may be determined.

The navigation satellite information may include at least one of a time, orbit data, an almanac, information on a location of the receiving terminal, and information on a speed of the receiving terminal. Here, the time, the orbit data, and the almanac may be associated with the navigation satellite.

When the navigation satellite information is not stored in the database, the clock offset may be computed based on the navigation signal in operation 530.

According to an aspect, when the navigation satellite information is not stored in the database, a Doppler frequency shift may be computed based on a correlation between the Doppler frequency shift and a code offset. Here, the Doppler frequency shift may represent a shift value obtained by a motion of the navigation satellite and a motion of the receiving terminal.

Additionally, the clock offset may be computed by subtracting the Doppler frequency shift from a frequency offset detected from the navigation signal.

Hereinafter, an operation of computing the Doppler frequency shift based on the correlation, and computing the clock offset will be further described with reference to FIG. 6.

Figure 6:
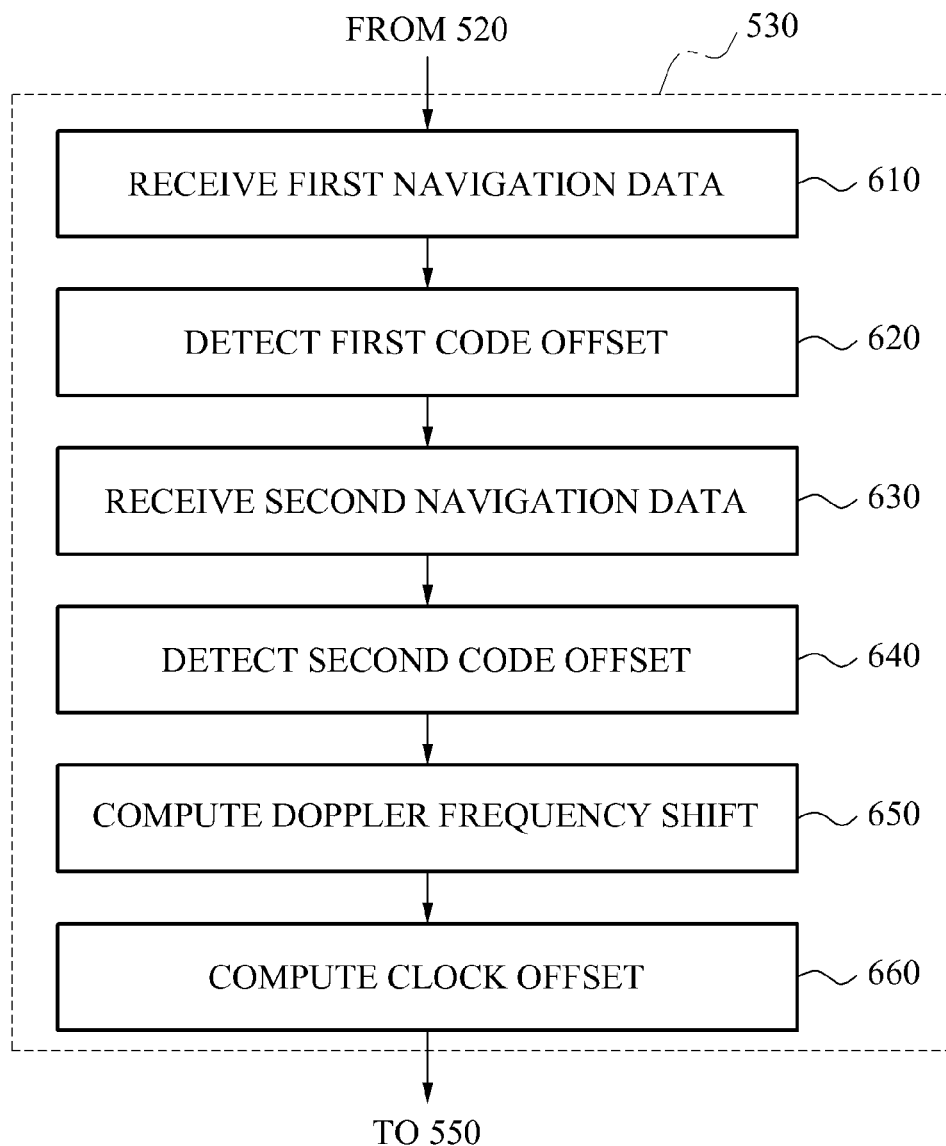
FIG. 6 is a flowchart illustrating an operation of computing a clock offset of a receiving terminal when navigation satellite information is not stored in a database, in the navigation signal processing method of FIG. 5.

FIG. 6 is a flowchart illustrating operation 530 of FIG. 5.

Referring to FIG. 6, in operation 610, first navigation data may be received from the navigation satellite.

In operation 620, a first code offset may be detected from the first navigation data. Depending on embodiments, a satellite number of a navigation satellite, and a first frequency offset may be further detected from the first navigation data.

In operation 630, second navigation data may be received after a time interval synchronized with a code period of the navigation signal.

In operation 640, a second code offset may be detected from the second navigation data. Depending on embodiments, a satellite number of a navigation satellite, and a second frequency offset may be further detected from the second navigation data.

When the navigation satellite information is not stored in the database, the Doppler frequency shift may be computed, based on a carrier frequency, a code frequency, a time interval, and a value obtained by subtracting the first code offset from the second code offset in operation 650. Here, the carrier frequency, the code frequency, and the time interval may be associated with the navigation signal.

In operation 660, the clock offset may be computed by subtracting the Doppler frequency shift from the frequency offset detected from the navigation signal.

Referring back to FIG. 5, when the navigation satellite information is stored in the database, the clock offset may be computed based on the navigation satellite information in operation 540.

According to an aspect, a Doppler frequency shift may be computed based on the navigation satellite information. Additionally, the clock offset may be computed by subtracting the Doppler frequency shift from the frequency offset detected from the navigation signal.

Hereinafter, an operation of computing the Doppler frequency shift based on the navigation satellite information, and computing the clock offset will be further described with reference to FIG. 7.

Figure 7:
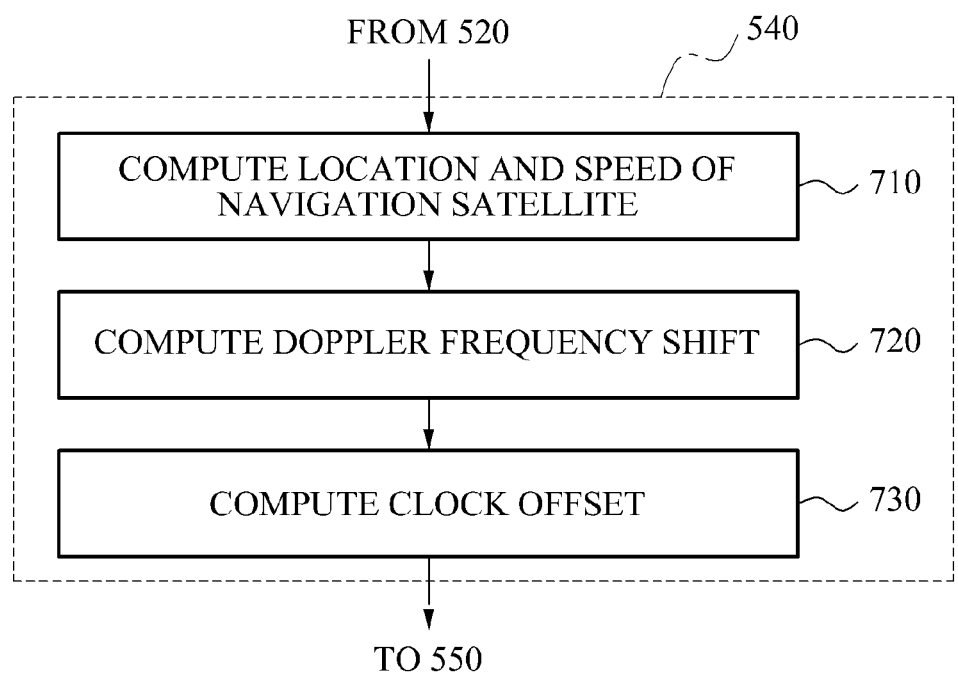
FIG. 7 is a flowchart illustrating an operation of computing a clock offset of a receiving terminal when navigation satellite information is stored in a database, in the navigation signal processing method of FIG. 5.

FIG. 7 is a flowchart illustrating operation 540 of FIG. 5.

Referring to FIG. 7, when the navigation satellite information is stored in the database, a location and a speed of the navigation satellite may be computed based on the navigation satellite information in operation 710. Depending on embodiments, the location of the navigation satellite may be computed in the form of (SVx, SVy, SVz), and compute the speed of the navigation satellite may be computed in the form of (SVvx, SVvy, SVvz).

In operation 720, the Doppler frequency shift may be computed, based on the location of the navigation satellite, the speed of the navigation satellite, a carrier frequency, a speed of a light, a distance between the navigation satellite and the receiving terminal, and the location and a speed of the receiving terminal. Here, the location of the receiving terminal may be displayed, for example, in the form of (RXx, RXy, RXz), and the speed of the receiving terminal may be displayed, for example, in the form of (RXvx, RXvy, RXvz). Additionally, the location and the speed of the navigation satellite may be included in the navigation satellite information.

In operation 730, the clock offset may be computed by subtracting the Doppler frequency shift from the frequency offset detected from the navigation signal.

Referring back to FIG. 5, in operation 550, a frequency offset and a code offset may be detected from the navigation signal.

In operation 560, a search range may be searched for, and location information regarding the location of the receiving terminal may be generated. Here, the search range may be based on the frequency offset and the code offset, except the clock offset.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A navigation signal processing apparatus for processing a navigation signal received from a navigation satellite to thereby facilitate navigation signal acquisition of a receiving terminal, the navigation signal processing apparatus comprising:
   a database;
   a receiving unit configured to receive the navigation signal from the navigation satellite, including to receive first navigation data and to subsequently receive second navigation data after a time interval synchronized with a code period of the navigation signal;
   a processing unit configured to detect a frequency offset and a code offset from the navigation signal, including to respectively detect first and second code offsets, and to respectively detect first and second frequency offsets, from the received first and second navigation data; and
   an operation unit configured to compute a clock offset of the navigation signal that is a difference between the second frequency offset and a Doppler frequency shift, including
      when navigation satellite information associated with the navigation satellite is not stored in the database, to calculate the Doppler frequency shift using a difference between the first and second code offsets, the time interval, and a carrier frequency and a code frequency set in accordance with the navigation signal, and
      when the navigation satellite information is stored in the database, to calculate the Doppler frequency shift using a location and a speed of the navigation satellite, a location and a speed of the receiving terminal, and the carrier frequency; wherein
   the processing unit performs the navigation signal acquisition using the computed clock offset and a search range that is determined by the second frequency offset and the second code offset, but not by the computed clock offset.

2. The navigation signal processing apparatus of claim 1, wherein, when the navigation satellite information is not stored in the database, the operation unit is configured to calculate the Doppler frequency shift using the following equation:

The Doppler frequency shift=[(the second code offset−the first code offset)*the carrier frequency]/(the code frequency×the time interval).

3. The navigation signal processing apparatus of claim 1, wherein, when the navigation satellite information is stored in the database, the operation unit is configured to calculate the Doppler frequency shift using the following equation:

The Doppler frequency shift=−(The Carrier frequency)/(Speed of light)*((SVx−RXx)*(SVvx−RXvx)+(SVy−RXy)*(SVvy−RXvy)+(SVz−RXz)*(SVvz−RXvz))/(Distance between the navigation satellite and the receiving terminal), Wherein
(SVx, SVy, SVz) represents the location of the navigation satellite,
(SVvx, SVvy, SVvz) represents the speed of the navigation satellite,
(RVx, RVy, RVz) represents the location of the receiving terminal, and
(RVvx, RVvy, RVvz) represents the speed of the receiving terminal.

4. The navigation signal processing apparatus of claim 3, wherein the distance between the navigation satellite and the receiving terminal is calculated as $$\sqrt{(SVx-RXx)^2+(SVy-RXy)^2+(SVz-RXz)^2}.$$

5. A navigation signal processing method for processing a navigation signal received from a navigation satellite to thereby facilitate navigation signal acquisition of a receiving terminal, the navigation signal processing method comprising:
   receiving the navigation signal from the navigation satellite, including receiving first navigation data and subsequently receiving second navigation data after a time interval synchronized with a code period of the navigation signal;

detecting a frequency offset and a code offset from the navigation signal, including respectively detecting first and second code offsets, and respectively detecting first and second frequency offsets, from the received first and second navigation data;

computing a clock offset of the navigation signal that is a difference between the second frequency offset and a Doppler frequency shift, including when navigation satellite information associated with the navigation satellite is not stored in a database, calculating the Doppler frequency shift using a difference between the first and second code offsets, the time interval, and a carrier frequency and a code frequency set in accordance with the navigation signal, and when the navigation satellite information is stored in the database, calculating the Doppler frequency shift using a location and a speed of the navigation satellite, a location and a speed of the receiving terminal, and the carrier frequency;

and performing the navigation signal acquisition using the computed clock offset and a search range that is determined by the second frequency offset and the second code offset, but not by the computed clock offset.

6. The navigation signal processing method of claim 5, wherein, when the navigation satellite information is not stored in the database, the calculating includes calculating the Doppler frequency shift using the following equation:

$$\text{The Doppler frequency shift} = [(\text{the second code offset} - \text{the first code offset}) * \text{the carrier frequency}] / (\text{the code frequency} \times \text{the time interval}).$$

7. The navigation signal processing method of claim 5, wherein, when the navigation satellite information is stored in the database, the calculating includes calculating the Doppler frequency shift using the following equation:

$$\text{The Doppler frequency shift} = -(\text{The Carrier frequency})/(\text{Speed of light}) * ((SVx-RXx)*(SVvx-RXvx)+(SVy-RXy)*(SVvy-RXvy)+(SVz-RXz)*(SVvz-RXvz))/(\text{Distance between the navigation satellite and the receiving terminal}),$$

Wherein $(SVx, SVy, SVz)$ represents the location of the navigation satellite, $(SVvx, SVvy, SVvz)$ represents the speed of the navigation satellite, $(RVx, RVy, RVz)$ represents the location of the receiving terminal, and $(RVvx, RVvy, RVvz)$ represents the speed of the receiving terminal.

8. The navigation signal processing method of claim 7, wherein the distance between the navigation satellite and the receiving terminal is calculated as $$\sqrt{(SVx-RXx)^2+(SVy-RXy)^2+(SVz-RXz)^2}.$$

* * * * *